ROTATING-HEAD MEMORY SYSTEM UTILIZING NON-CONTACTING FLEXIBLE RECORD MEMBER

Filed Jan. 3, 1968 4 Sheets-Sheet 1

INVENTORS
GREGORY J. EHALT
GEORGE D. BUKOVICH
WILLARD C. NEUMAN

BY Charles A. Johnson
ATTORNEY

Feb. 2, 1971 G. J. EHALT ET AL 3,560,946

ROTATING-HEAD MEMORY SYSTEM UTILIZING NON-CONTACTING FLEXIBLE RECORD MEMBER

Filed Jan. 3, 1968 4 Sheets-Sheet 4

A= NUMBER OF DATA LINES HANDLED IN PARALLEL

B= NUMBER OF LINES NECESSARY TO ADDRESS SYSTEM CAPACITY

C= 1 LINE PER CONTROL FUNCTION

D= NUMBER OF LINES TO CARRY VOLTAGES REQUIRED WITHIN ROTOR

United States Patent Office 3,560,946
Patented Feb. 2, 1971

3,560,946
ROTATING-HEAD MEMORY SYSTEM UTILIZING NON-CONTACTING FLEXIBLE RECORD MEMBER

Gregory J. Ehalt, Long Lake, George D. Bukovich, Minneapolis, and Willard C. Neuman, St. Paul Park Village, Minn., assignors to Sperry Rand Corporation, New York, N.Y., a corporation of Delaware
Filed Jan. 3, 1968, Ser. No. 695,500
Int. Cl. G11b 21/02, 5/60
U.S. Cl. 340—174.1 16 Claims

ABSTRACT OF THE DISCLOSURE

A memory system having magnetic transducers mounted in a rotatable support member for cooperating with flexible record members is described. A system for mounting the transducer selection circuits within the rotatable support member is also described. The rotatable support member supports the flexible record members on a boundary layer of air, and a record member profile correction system ensures that the flexible record members are uniformly positioned to cooperate with the moving transducers.

BACKGROUND OF THE INVENTION

(1) Field of the invention

This invention relates generally to the field of magnetic recording and reading of data signals. More specifically, it relates to the system of magnetic recording that utilizes transducers having relative motion with respect to a record media for generating the fields to record, and for sensing the state of a recorded magnetic state to read. Still more specifically, it relates to a magnetic recording system wherein the record member is held relatively stationary, at least at one end; and, the transducer, or transducers, is caused to move with respect to the record surface. Finally, this invention relates to a system for bringing the record member into a uniform profile across its width and along its length, when supported by a boundary layer of air, for cooperative relation with transducers that are mounted in a rotating support member.

(2) Description of the prior art

The prior art has seen various attempts at recording signals on a magnetic record member by utilizing movable transducers. Some of the prior art systems have dealt with recording of analog signals, as in video recording, while others have dealt with recording of digital signals, as in data processing systems. The prior art is replete with various examples of magnetic tape systems having supply and take-up reels, with the tape in contact with movable transducers. These arrangements provide for holding tension on both ends of the tape as it is in cooperation with the movable transducers. It is also characteristic of the prior art that comparatively low relative rates of motion between the heads and surface are utilized. For the low rates of motion, head contact with the record member along with end-tension on the magnetic tape were adequate. However, when such techniques are applied to high speed data processing uses, the record member wear and slow speeds are not satisfactory.

In the rotatable magnetic drum or disk systems of the prior art, it has been found that the optimum storage density can be achieved by minimizing the spacing from the transducer to the moving record surface. When the transducers are fixed in a mount, this spacing is characteristically in the range of 0.001 to 0.003 inch, thereby allowing for bearing or record surface imperfections, and for differences in coefficients of expansion of various materials when the system is up to operating temperature. When the transducers are so mounted that they are supported in operation on the laminar layer of air caused by the moving record member, this spacing can be improved. The latter mode of operation is commonly referred to as "flying head" operation. This type of flying operation has the additional advantage of providing for the head to follow surface imperfections to a certain extent without contacting the record surface. Such drum or disk systems provide good access rates to store data items, but are limited to the sorage capacity of the fixed record member surface. Due to the mass of the flying heads however, practical limitations on spacing are imposed so that drum run-out or other physical deviations are not permitted to cause catastrophic crashes into the drum surface. Additionally, relatively expensive mechanisms are required for supporting and raising and lowering the flying heads into operative position. Further, if files are generated that are to be stored for periods of time other than while in use, it is necessary to have an auxiliary storage, such as magnetic tape, to which the data can be transferred, thereby allowing the disk or drum systems to be utilized in other computational and storage programs. This of course requires additional expensive equipment and requires valuable computer time to be utilized to effect the data transfers. It is necessary when the data is to be used again, to retransfer it to the drum or disk by way of an auxiliary storage.

The prior art has also seen systems devised for utilizing exible magnetic tape strips as the record medium. In order to position these tape strips in relation to the transducers, it has been characteristic either to fix both ends of the magnetic tape, as described above, or to position the tape strips with a guide member against one surface while having the transducers operable with the other surface of the tape strip. Either of the systems is unnecessarily complex and expensive over the system of this invention. It is of course clear that the record medium life is extremely short when the transducer contacts the record member. Many of these prior art systems have operated with fixed transducers, and with the record member rotated past the transducer. This causes a problem of transducer-to-record member spacing of the type encountered in fixed-head drum systems, and the storage density cannot be increased as desired.

It has been recognized in the prior art that the record member profile tends to be a problem when a record member having a finite thickness is bent around a positioning device, such as a cylinder, for moving the record member into cooperative relationship with fixed transducers. One attempt in the prior art to correct the profile of the curved record member was to provide notches running along the length of the record member and disposed near the edges thereof. Such notching of course greatly increases the manufacturing cost of the record members. In a typical data processing system application, the magnetic record member, such as the tape strip, follows a curved linear path passing through the guide mechanism to the magnetic recording or reproducing head assembly.

As mentioned above, it has been found in prior art systems that when the record member moves in a curved path it does not remain flat along its transverse direction, but tends to curve or curl at its edges because the longitudinal tension created by the curvature introduces lateral contraction and expansion. The record member is a planar body having a finite thickness, and when it is bent about a central axis normal to given side edges of the plane of the member, the outer surface of the member stretches, while the inner surface of the member compresses relative to the transverse midplane of the member. This disparity in tensile and compressive forces along the arc followed by the member leads to the observed lateral contraction or expansion of the member. The ultimate result is that the curved outer edges of the member bend outwardly, that is, upwardly away from the transverse midplane of the member in a direction opposite the direction of the bend of the member as a whole, to exhibit what is known as anti-elastic curvature.

Even in systems that provide for holding the record member body at both ends thereof, the problem of anti-elastic curvature is noticeable when the span between gripped portions is relatively long. However, when the record member is gripped only at its leading edge, with the record member supported on a film of air so as to leave a minute but discernible spacing between the record member and a rotatable drum support, the record member represents a classic case of an elastic member acted upon by bending forces in such a manner as to create the anti-elastic curvature mentioned above.

In addition to the anti-elastic curvature just described, it has been found that as the rotatable transducer support member is rotated at relatively high rates, the air that is trapped between the surface of the rotor and the under surface of the record member tends to be constricted such that the record member is bowed outwardly at the center of the record member along its length. It has been found, as described in a copending patent application of G. D. Bukovich, et al., and filed Jan. 3, 1968, with Ser. No. 695,502, that by drawing a controlled vacuum under the flexible record member, the record member profile is much corrected. This will be described in more detail below.

For purposes of discussion herein, no distinction is drawn between so-called "laminar air" flow, and "turbulent" air flow. Both are considered to be included in terminology such as "boundary layer of air," "laminar boundary layer," "laminar air flow," or other combinations of such terms that may be utilized herein. The intent is to define the air flow that supports the flexible record members by such terms, whether it be comprised of purely laminar air flow, turbulent air flow, or a combination of both.

It has also been found, as described in a second copending patent application of G. D. Bukovich, et al., filed Jan. 3, 1968, with Ser. No. 695,501 that by providing various treatments for the surface of the rotor, the profile of the magnetic member in the vicinity of the transducers can be much improved. Some of the systems described in the copending patent applications for correcting the profile include milling or etching grooves in the surface of the rotor for dispersing some of the air which is normally trapped under the record member; and, alternatively, for providing a means of deflecting the flow of air immediately preceding the line of transducers such that the record member is also deflected in a manner to cause it to come into a corrected profile for cooperation with the transducers. Some of these deflecting means provided in a position leading the transducers include a bar or pair of bars mounted on the surface of the rotor, a slot milled along the length of the rotor, a curved ramp on the surface of the rotor, a flat on the rotor, or a spiral shaped rotor. In such systems, the speed of the rotor along with the rippling deflection of the record member which is otherwise held stationary at one end tend to eliminate the bowing effect of the record member. While such systems have much improved over the notching of the edges of the record member, or other known systems of profile correction, they do include a problem of record member fatigue due to the continual flexing of the record member as the rotor sweeps around. Additionally, the specially formed rotor configurations are substantially more complex and expensive to manufacture than the cylindrical rotor which can be utilized with this invention. Finally, the precise form of the deflecting means selected for the rotor need not be matched exactly to the physical dimensions of the record member when considered in conjunction with the speed of rotation of the rotor.

SUMMARY

The apparatus of this invention is for use in a magnetic storage system that employs a plurality of transducers mounted in a rotatable support member, referred to as a rotor. The read/write circuits and timing circuits, along with the transducer-selection circuits are mounted inside the rotor, thereby greatly reducing the number of input/output lines that must otherwise be utilized for a high-density memory system. The addressing signals are taken into the rotor and the signals are carried out of the rotor by way of rotative coupling means, such as mercury slip-rings, with specific addressing and timing control being accomplished within the rotors. The record member comprises one or more tape strips having a magnetizable material coated on one side thereof and is positioned around the rotor and firmly clamped at one end. The other end is left free to float. As the rotor is caused to spin, the tape strip is supported on a boundary layer of air just out of contact with the surface of the rotor. The record member-to-rotor spacing can be made very small due to the relatively low mass of the record member that is floated, as opposed to the heads that were floated in the prior art systems.

In order to achieve optimum access rates, the rotor is rotated at a high speed. If the rotor has a completely cylindrical peripheral surface and no record member profile correction apparatus is employed, the high speed of rotation tends to cause the tape strip record member to bow outward from the rotor forming a curved trough along the length of the tape strip. This bowing causes the read/write spacing of transducers near the center of the tape along the length of the rotor to be larger than the spacing near the edges of the tape strip. Such larger spacing causes a marked decrease in the recording density that can be achieved. For instance, a characteristic density at the center could be in the range of approximately 70 bits per inch, while the density at the edges could be in the range of approximately 1000 bits per inch. It can be seen that without profile correction the choices are to reduce the density to the lowest density achievable at the center, or to have different densities for different tracks. Neither of these choices is acceptable for a high performance, mass storage memory system. Additionally, this creates a problem in adjusting the read/write circuitry to achieve uniform signals to be transmitted out of the storage system, and decreases reliability of the system.

It has been found that by providing profile correction means, such as a vacuum system or the special rotor configurations mentioned above, the bowing effect caused by the rotation of the rotor can be virtually eliminated. By the addition of the relatively inexpensive vacuum profile correction device, or by using one of the special rotor configurations, it is unnecessary to provide special record members mentioned above. That is, the tape strip record member can be formed from a flat stock and need not have edges which are notched. Finally, the vacuum system profile correction means for bleeding off portions of the boundary layer of air is subject to being closely controlled. This allows for the memory system to utilize various sources of supply of magnetic record members which may vary in physical dimensions such as thickness and flexibility. By merely adjusting the vacuum system, these varying characteristic record members may be equally spaced from the surface of the rotor, thereby giving a great deal of flexibility to the total memory system. It should be noted also, that by the use of the vacuum system the record member is not caused to go through continuous deflection movements; but, instead, is caused to be drawn into a tight concentric profile just out of contact with the surface of the transducer supporting rotor. This profile extends virtually no fatigue-inducing deflections to the record member; hence, failure of the record member due to fatigue is virtually non-existent when using the vacuum profile correction system. Therefore, while any of the mentioned systems of record member profile correction can be utilized, the vacuum system is to be preferred.

A primary object of this invention, then, is to provide an improved memory system that utilizes one or more flexible record members in conjunction with movable transducers mounted in a rotatable support member. Another object is to provide an improved memory system wherein the record members are supported on a boundary layer of air surrounding a rotatable transducer mount. Still another object is to provide a memory system wherein flexible record members are attached at only one end with the other end left free to float. Yet another object of the invention is to provide an improved memory system having apparatus for correcting the profile of a flexible record member around the surface of the rotatable transducer mount. Still another object of the invention is to provide an improved flexible record member profile correcting system wherein a vacuum system is utilized to draw off a portion of the boundary layer air flow such that the record member profile is brought into a uniform concentric profile around the surface of the rotatable transducer mount. A further object of this invention is to provide a memory system in which the transducer selection circuits are mounted within a rotatable transducer supporting means, thereby minimizing the coupling means required for accessing the desired areas on the flexible record members. Another object of this invention is to provide a memory system in which record members can be readily interchanged. A further object of the invention is to provide a memory system in which elaborate record member-to-transducer spacing apparatus is not required.

DESCRIPTION OF THE PREFERRED EMBODIMENT

Figure 1:
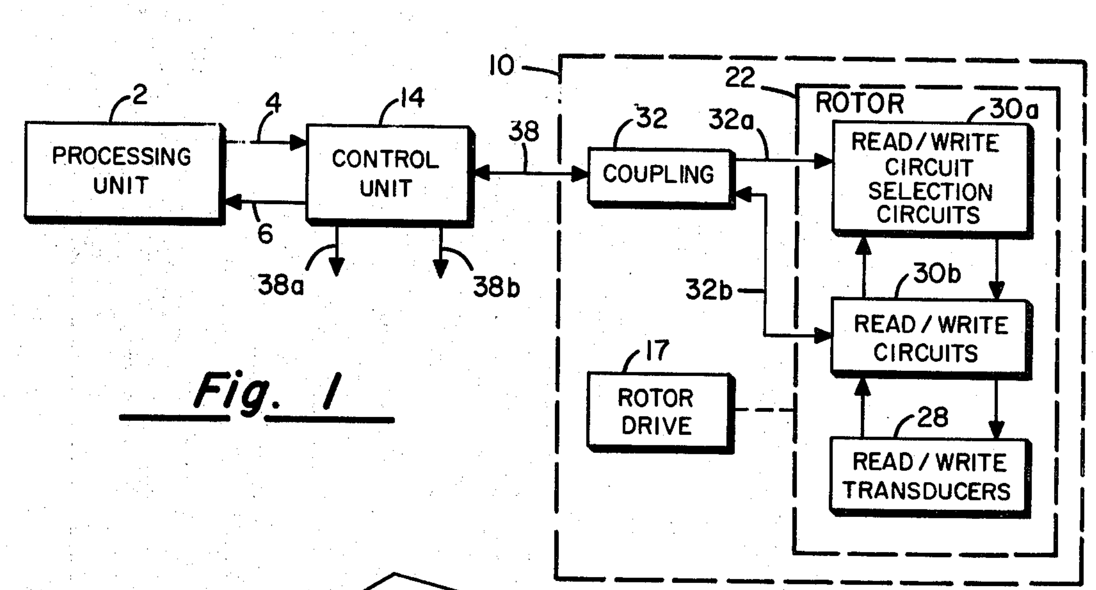
FIG. 1 is a block diagram illustrating a data processing system which incorporates the improved memory system of this invention.

FIG. 1 is a block diagram of a data processing system which incorporates the improved magnetic Memory System of this invention. In this data processing system there is a Processing Unit 2 which is capable of performing various arithmetic and logical functions as may be necessary. A Processing Unit of this type can be of a unit/computer type wherein there is usually incorporated an arithmetic unit, a control unit, an input/output unit, and an internal storage, usually of a relatively high access rate. Alternatively, the Processing Unit can be chosen from a multiprocessor capability and would then include an arithmetic unit, a control unit, an input/output unit, and only enough memory to store intermediate results and program control words. The latter memory is often referred to as a "scratch-pad" memory. This discussion is merely by way of background and a particular Processing Unit forms no part of this invention, it being intended merely to put the memory unit in a system aspect for ease of understanding. Signal carrying cables 4 are for carrying control commands and data to be recorded, and cables 6 are for carrying input data to the Processing Unit 2. The improved magnetic Memory System of this invention is illustrated enclosed within dashed block 10.

Figure 2:
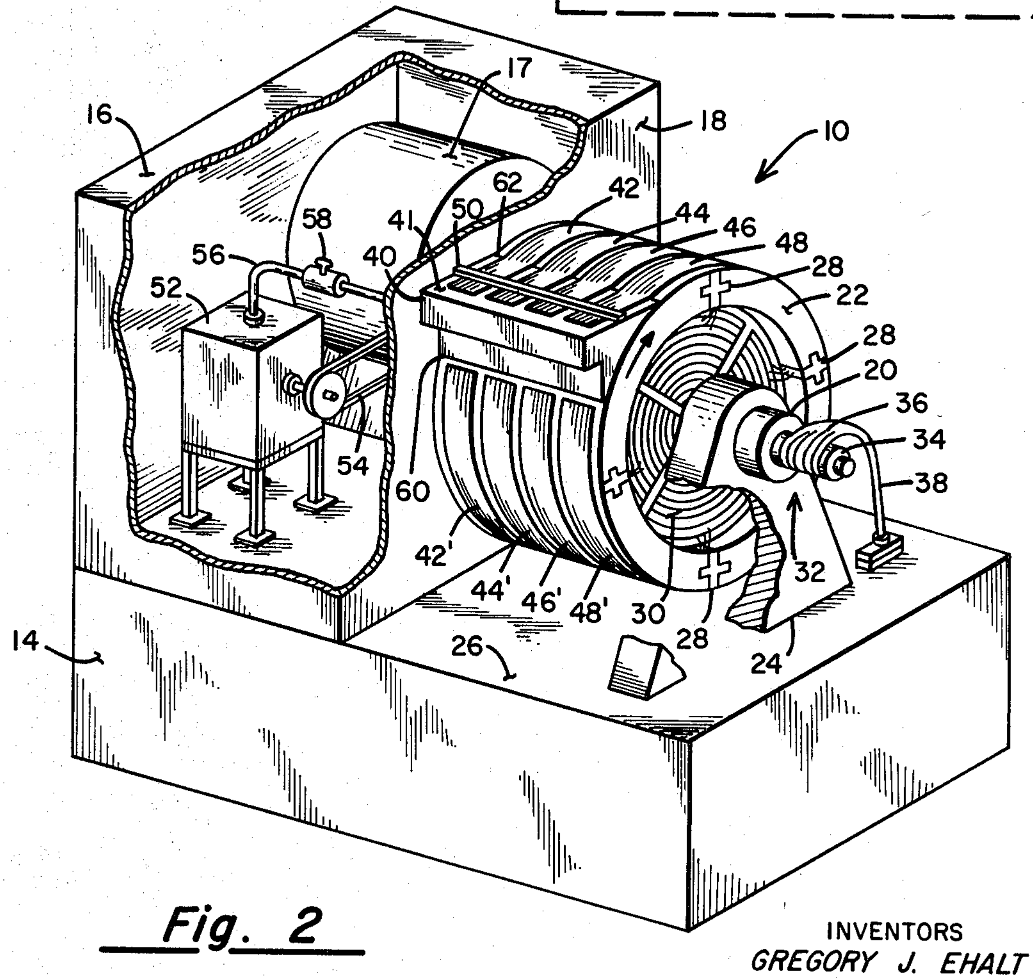
FIG. 2 is a schematic perspective view of a magnetic memory system utilizing rotatable read/write heads and incorporating one embodiment of this invention.

Intermediate the Processing Unit and the Memory System 10 is a Control Unit 14. For ease of explanation, the Control Unit will be described functionally only since it can have various purposes and functions that vary markedly and depend on the type of system in which the Memory System 10 may be utilized. The nature of the Control Unit 14 depends on the nature of the data processing system and does not limit the scope of the invention of the Memory System 10. As will be seen when the system in FIG. 2 is considered, a Memory System 10 operates with one or more flexible record members. The flexible record members are not illustrated in FIG. 1. The structure which cooperates with the flexible record member is referred to as the rotor and is shown enclosed in dashed block 22. A drive motor 17 is utilized to drive motor 22 at a predetermined speed in a predetermined direction. Mounted within the rotor 22 is a plurality of read/write transducers 28, the details of which will be set forth below.

The improved Memory System of this invention is so-called "addressable." While the Memory System is addressable, it is a cyclic memory and not immediately accessible in the nature of high speed magnetic core memories of the prior art. The cyclic nature of the Memory System is such that there is a period of latency which is determined by the position of the transducers at any given time with respect to a selected portion of the magnetic member that is to be read or recorded. In this regard, the Memory System of this invention is most analogous to a magnetic drum or magnetic disk memory system of the type known in the prior art. These memory systems are distinguishable from serial memory systems, such as magnetic tape systems, wherein the memory is non-cyclic and the record member must be positioned from a supply reel to a take-up reel in order to access the desired portion of the record member. Other serial records can be punched cards or paper tape. It is apparent, that the Memory System of this invention will not match the access rate of the magnetic core memories mentioned above, but is of a substantially higher access rate than the magnetic drums and disks of the prior art, and has an access rate several orders of magnitude greater than the serial memories.

In addition to the read/write transducers 28 mounted in the rotor 22, the rotor operates as a housing for mounting the read/write circuit selection circuitry **30*a* and the read/write circuits 30*b*. In order to access selected read/write transducers, it is necessary to supply a so-called "address" to the Memory System 10**. The address, as is commonly known, can be comprised of a plurality of signals which, according to their predetermined permutations, identify the addressable portions of the magnetic record member.

The rotative coupling 32 must be provided for carrying data signals to be recorded to the Memory System 10, and for taking the signals read from the record member out of the Memory System 10 for utilization ultimately by the Processing Unit 2. The coupling 32, for this embodiment, is comprised of mercury slip rings of a type available commercially. It should be pointed out, however, that the coupling can also be of a capacitive nature or an inductive nature. The configuration of the coupling 32 and the number of contacts required will be described in more detail below. The coupling 32 directs the address signals to the read/write circuit selection circuits **30*a* by way of conduction paths 32*a*. The read/write circuits 30*b* read signals to be recorded through coupling 32 onto lines 32*b* for recording on the record member, or alternatively, read signals from the record member over lines 32*b* through coupling 32 and out to the Control Unit 14. The coupling of the Control Unit 14 to coupling 32 is by way of cable 38. While only one Memory System 10 is shown, a Control Unit 14 can control other Memory Systems, for instance by coupling individual Memory Systems to lines 38*a* and 38*b***, respectively.

The Control Unit 14 operates to receive memory system control signals from the Processing Unit 2 over cable 4 and to initiate the operation requested. For instance, if the operation is to "Read" at a specified address, Control Unit 14 operates to initiate the "Read" operation and to select the appropriate Memory System 10. This will be described in more detail below. For the "Read" operation, control signals are sent through coupling 32 from the read/write circuits **30*b*, thereby indicating to Control Unit 14 the position of the transducers 28 with regard to the record member. When the appropriate position is reached, the data signals are gated by the Control Unit 14 from the read circuits 30*b* over cable 32*b* through coupling 32, and over cable 38 into the Control Unit. If the particular memory configuration is one of complete serial operation, the Control Unit will include circuitry (not shown) for assembling a data word for transmission over cable 6 to the Processing Unit 2. Of course, if Processing Unit 2 is of a serial type the Control Unit 14 need not assemble the word in parallel but may pass the digits directly in serial over cable 6. Alternatively, if the Memory System operates in complete parallel mode, the digits of the word read in parallel by read circuit 30*b* will be passed through appropriate coupling contacts of coupling 32 into the Control Unit 14 for transmission in parallel over cable 6 to the Processing Unit. Yet another arrangement, and the type that will be described in more detail below, is one in which there are digits read in parallel, but the parallel grouping is less than a total word as utilized by the Processing Unit 2. For instance, when four digits are read in parallel and the Processing Unit requires a thirty-six digit word, the Control Unit 14 would read nine successive four digit groups and assemble a single thirty-six bit word for transmission over cable 6** to the Processing Unit.

When a "Write" operation is specified by Processing Unit 2, Control Unit 14 provides a "Write" selection signal to Memory System 10, and also provides the "Write" address to coupling 32. For the "Write" operation, control signals are sent through coupling 32 from the read/write circuits **30*b*, thereby indicating to Control Unit 14 the position of transducers 28 with regard to the record member. When the appropriate position is reached, the data signals are gated by Control Unit 14 to write circuits 30*b* over lines 32*b*. As indicated above, it is common for the Processing Unit 2 to operate on words comprised of 36-bits in parallel. In such a situation, Control Unit 14** includes circuitry (not shown) for breaking the digits into the bit-groupings that are utilized in the Memory System. The choice of the number of parallel bits to be handled by the Memory System is a design choice that balances the access rate of complete parallel operation against the extra coupling contacts that are required for each parallel bit added.

The various recording systems and the control by Control Unit 14 are illustrative only and detailed circuitry for the Processing Unit 2 and the Control Unit 14 will not be shown in detail since it would not tend to clarify an understanding of the Memory System 10. The various physical and electrical arrangements of the Memory System 10 will be set forth in greater detail below.

FIG. 2 is a schematic perspective view of a magnetic recording system which illustrates an embodiment of this invention. The magnetic Memory System is shown generally as 10 and includes a housing for Control Unit 14 for the electronic circuitry that it utilized in the reading and recording of information and in the addressing of specified memory registers in the Memory System. This electronics is not shown in detail, but will be functionally described below. A second portion 16, shown broken away, houses a drive motor 17. Mounted to one wall 18 of housing 16 is a shaft 20, that extends through and supports cylindrical rotor 22. A characteristic rotor can be 10½ inches in diameter and about 20 inches in length when used with four record members of the type described below. Of course these dimensions are purely illustrative, and length and diameter can be chosen to suit the particular design requirements desired. Shaft 20 is rotatably mounted at wall 18 and by support member 24, which in turn is supported by the upper surface 26 of housing 14. Support member 24 is shown partially broken away to better illustrate the configuration of rotor 22. Rotor 22 is utilized to support a plurality of read/write transducers 28, also referred to as read/write heads, along the length of the rotor. For this embodiment there is only one read/write transducer per track on the magnetic record member. The number of tracks per record member can be 256, characteristically. Since the record member strips are about 4½ inches wide, it becomes difficult to form the windings small enough to permit all transducers for all tracks to be arranged side-by-side. Instead, they are staggered, and a plurality of rows are utilized. For this embodiment there are four rows. This is a matter of construction, and the operation appears as though the heads are all in parallel along a single track.

Located internal to the rotor 22 is the electronic circuitry for performing the head selection for accessing a desired portion of the memory. This head selection circuitry is illustrated as element 30. This will be described in more detail below. The head selection circuitry 30 is mounted on doughnut-shaped support members and mounted around shaft 20 (see FIG. 6). That is, the support members are circular with a predetermined thickness and with a center portion cut out. The coupling of the address selection signals into the head selection circuitry 30 and the reading of information out of the Memory System to a utilization device is by way of a rotative coupling 32. The coupling 32 can be for instance a set of mercury slip-rings, having a rotatable portion 34 associated with the sliding contact portions 36, which in turn are coupled into cable 38 for connection to the electronic circuitry in housing 14. Alternatively, a capacitive or inductive coupling could be utilized. The drive motor 17 in housing 16 is coupled to the rotor, by conventional means such as a direct drive, a belt-drive, or the like, and causes the rotor to rotate at a rate of up to 7200 revolutions per minute.

Record member profile correction means are utilized. In the embodiment shown, the profile corrections means includes a portion mounted on wall 18, which in this case is the vacuum shoe 40, that extends across the length of rotor 22. Resting on the upper surface 41 of vacuum shoe 40 are first ends of four record members 42, 44, 46, and 48, each of which comprises a support member of flexible material coated with a magnetic surface on at least one side thereof. The magnetic surface is faced downwardly toward the outer surface of rotor 22. First ends of record members 42, 44, 46 and 48 are clamped between the surface 41 of vacuum shoe 40 and a clamping member 50, thereby securely holding the end of the record members. The record members extend around the rotor in the direction of rotation with record member ends 42′, 44′, 46′ and 48′ unrestrained. Due to the speed of rotation of rotor 22, there is developed at the outer surface thereof a flow of air which tends to support the record members just out of contact with the outer surface and, additionally, tends to cause the record members to wrap around the surface of the rotor. While four record members have been shown, limitation thereto is not intended, since the number can be chosen from one to as many as switching circuitry can be provided for. Characteristic dimensions for the record member strips are 4½ inches wide by 5 mils in thickness, and of a length sufficient to pass around a desired portion of the rotor. Characteristically, the record members can be made from a Mylar base coated with a magnetizable layer for recording.

Also enclosed in housing 16 is a vacuum pump 52, of a type available commercially. The vacuum pump is coupled to the motor drive of motor 17, for instance by belt coupling 54, thereby being driven by the same prime mover as rotor 22. The vacuum pump 52 is coupled to the vacuum shoe 40 through wall 18 by means of hose 56. The vacuum hose 56 has a control valve 58, of a type readily available commercially, in the line such that the vacuum pressure in the vacuum shoe 40 can be adjusted. Depending upon the physical dimensions of the magnetic record members 42, 44, 46, and 48, the pressure in the vacuum shoe can be adjusted to derive the desired record member-to-rotor spacing. With the rotor dimensions and magnetic record member dimension mentioned above, a proper operation has been achieved with a vacuum in chamber 40 of approximately one to ten inches of mercury. Depending upon the degree of smoothness of the outer surface of rotor 22, the spacing of the record media to the surface of the rotor can be brought as close as the smoothness will permit without making physical contact. Reliable operation with a substantially uniform record member-to-rotor spacing of approximately 0.0003 inch has been achieved. Since the rotor 22 rotates in the direction shown by the arrow on the end thereof, edge 60 will be considered to be the leading edge, and edge 62, beneath the record members, will be considered to be the trailing edge of vacuum shoe 40. A characteristic spacing of the leading and trailing edges from the surface of rotor 22 can be approximately 0.005±.001 inch. Of course the closer the rotor 22 is to a perfect circle, the closer this spacing of the vacuum shoe to the surface of the rotor can be. It has been found, also, that the closer the spacing of the vacuum shoe 40 to the surface of the rotor 22, the lower the capacity of the vacuum pump 52 required. This comes from the fact that there is leakage around the edges of vacuum shoe 40 which introduces air currents into the vacuum shoe chamber which must also be withdrawn by the vacuum pump 52, in addition to the portion of the flow of air that is desired to be removed from beneath the surfaces of record members 42 through 48. It has been found that once adjusted for certain selected record members, the vacuum in shoe 40 tends to hold the record member-to-rotor spacing constant within allowable tolerances. Should it be desirable to provide a continuous monitor of the spacing, a servo system including sensors for sensing the spacing along with controls for opening or closing a valve, such as valve 58, automatically could be provided. Since the adjustment described above is adequate, a detailed showing of such a servo control system will not be made. The foregoing has been a description of the various elements of the embodiment, and a more detailed consideration of certain portions will be set forth below.

Figure 3:
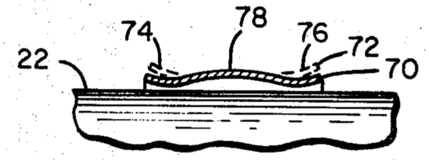
FIG. 3 illustrates a cross-sectional view of a flexible record member utilized in conjunction with a rotatable support member without a record member profile correction system.

FIG. 3 illustrates a cross-sectional view of a record member utilized in conjunction with a rotatable support member without a profile correction system. The record member profile 70 shown in solid lines illustrates a record member having a stiffness less than that of the record member 72, shown in dotted line. It will be noted that both record members are deflected at the edges upward away from the surface of rotor 22, but that the stiffer the material of the record member, the closer to the center of the record member are the deflection valleys 74 and 76. The bowing of the record members near the center 78 thereof, is caused primarily by the air that is trapped beneath the surface of the record member. It is for correcting this profile that the profile correction means is required.

Figure 4:
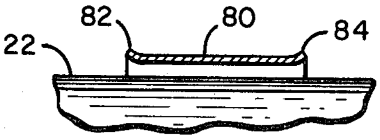
FIG. 4 illustrates a cross-sectional view of a flexible record member utilized in conjunction with a rotatable transducer support member but in a system that includes a record member profile correction system. FIG. *5a* is a front view of one embodiment of the improved memory system and illustrates four flexible record members both in the operative and inoperative positions. FIG. *5b* is an end view of the improved memory system of this invention and illustrates the operative relationship of the record member profile correction apparatus and the flexible record member both in the operative and the inoperative positions.

FIG. 4 illustrates a cross-sectional view of a flexible record member utilized in conjunction with a rotatable transducer support member, which includes a record member profile correction system. In this figure, the record member 80 can be seen to be substantially parallel across its width to the surface of the rotor 22. It will be noted that edges 82 and 84 are just slightly turned outward away from the surface of the rotor. This is due to the anti-elastic curvature mentioned above. It will be noted, however, that this very slight deflection of edges 82 and 84, with the profile correction system described herein is within tolerances that can be handled by the read/write circuits.

Figure 5A:
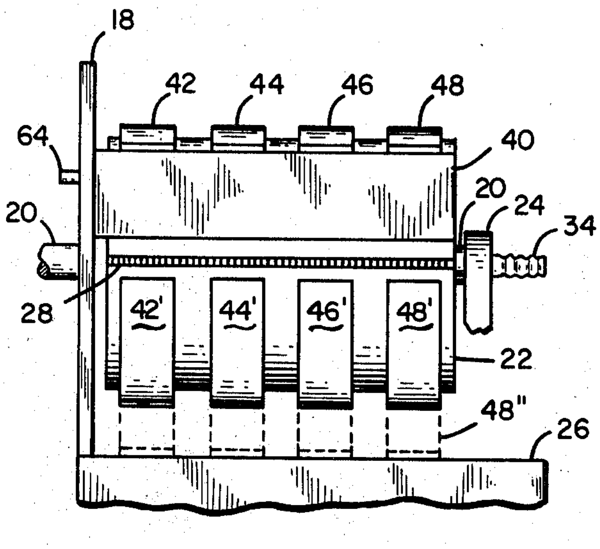
Figure 5B:
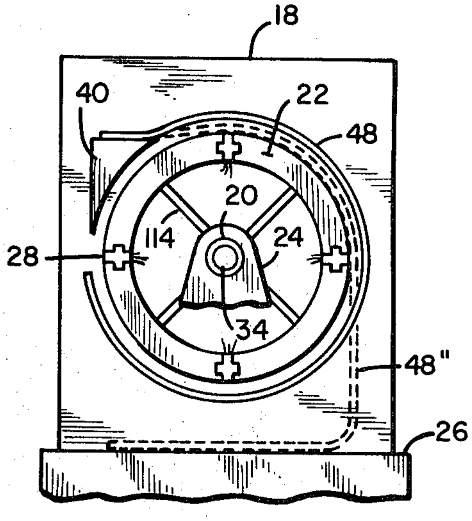

FIG. 5*a* is a front view of one embodiment of the improved Memory System and illustrates the four flexible record members mentioned above both in the operative and inoprative positions. Throughout the following explanation, the reference numerals that refer to items previously described will be carried through. In this figure, it can be seen that the vacuum shoe 40 is mounted to wall 18, and extends along the entire length of the rotor 22. One end of suporting shaft 20 is supported by support member 24, shown broken away, with the slip ring contact 34 extending beyond the support. The other end of shaft 20 extends out through wall 18 and will be adapted for being driven by the drive motor 17 mentioned above. The vacuum shoe 40 has a port 64 which extends through wall 18, adapted for being coupled to the vacuum pump 52 described above. It can be seen that the row of heads 28 which are exposed between the vacuum shoe 40 and the ends 42′, 44′, 46′ and 48′ of the record members, extend along the entire length of the rotor 22. It will be recalled from above, that the read/write heads are arranged with one head per track. The head position defines the track on the associated record member. It will be recalled also that due to the physical size of the windings which are arranged on the heads (see FIG. 8), in order to provide 256 heads for a single record member it is desirable that the heads be arranged in four such parallel rows around the surface of the rotor, with the heads for each track being offset. This can more clearly be seen in FIG. 5*b*. As indicated, the tracks appear to the outside system as though there is merely a single row of heads along the length of the rotor. When rotor 22 is being driven at its operational rate, for instance 7200 revolutions per minute, the flow of air around the surface of the rotor is such that the flexible record members are caused to form around the surface such that the ends 42′, 44′, 46′ and 48′ are wrapped upwardly toward the vacuum shoe as shown in FIG. 5*b*. When the rotor is not driven, such as during shut down periods, or when power is lost, it is not catastrophic to the record members, and they merely drop down to rest on surface 26 such as shown by the dotted lines and indicated for one of the record members as 48″. When record members are to be changed this is, of course, the position they assume until the rotor is brought up to speed.

Turning now to a consideration of FIG. 5*b*, which is an end view of the improved memory system of this invention and illustrates the operative relationship of the record member profile correction apparatus and the flexible record member both in the operative and inoperative positions, in a manner similar to that just described for FIG. 5*a*. This arrangement follows that just described, and illustrates the clearance of record member 48 completely around the outer periphery of rotor 22 when the rotor is up to operational speed. The dashed outline 48″ illustrates that when the rotor is caused to stop the record member merely falls down on the surface of the rotor for the portion that is supported, and drops to the lower surface 26. When the rotor is again caused to be rotated there is a brief sliding of the rotor under the record member, but the air flow causes the record member to lift off after a very brief time and again to be drawn into the tight concentric pattern illustrated by record member 48. The amount of frictional contact during startup is relatively insignificant as far as the wear that is imposed on record member 48 for reasonable numbers of such starting and stopping operation. Of course, a continued start-stop operation for many such operations would result in the magnetizable material being worn by the surface of the rotor.

Figure 6:
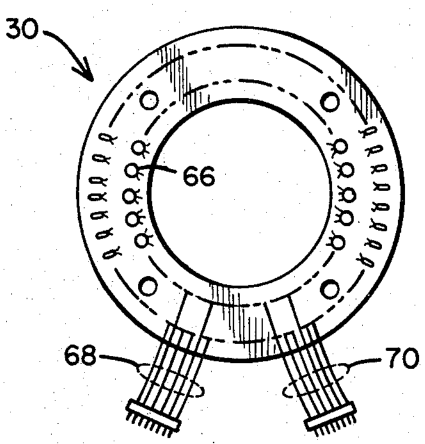
FIG. 6 illustrates an assembly for supporting a portion of the transducer selection circuitry for mounting within the rotatable support member.

FIG. 6 illustrates an assembly for supporting a portion of the transducer selection circuitry for mounting within the rotatable support member. The support member is referred to generally by reference numeral 30 and comprises a flat circuit-supporting member having a predetermined thickness. Mounted to the support, and appropriately intercoupled by printed circuit connections, are the switching circuits utilized in selecting the appropriate head grouping for reading and writing. These switching circuits can be integrated circuits or discrete components, and are referred to collectively as 66. In order to make connection to the slip ring coupling, a cable 68 terminated with a connector is employed. This cable is utilized for carrying the control signals and data signals read from the record member out to the Control Unit and for carrying the data signals to be recorded onto the record member in from the Control Unit. A second cable 70 terminated in a connector is utilized for coupling the circuitry 66 to the associated head groupings. The signals carried on cable 70 are the actual signals read by the transducers from the record member and the signals carried to the transducers for recording on the record member. The composition of circuitry 66 and the arangements of cables 68 and 70 will be descibed in more detail in conjunction with FIG. 11. The mounting in the rotor will be described in deatil in conjunction with FIG. 10.

Figure 7:
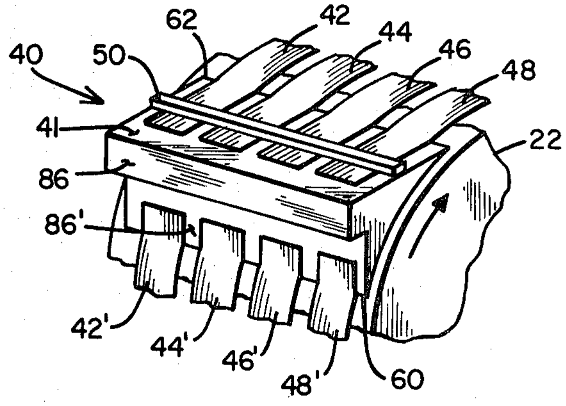
FIG. 7 is a perspective view of an alternate embodiment of the record member profile correction vacuum shoe.

Turning now to a consideration of FIG. 7, which illustrates a broken away portion of rotor 22 and an alternative arrangement of a vacuum shoe 40, it will be seen that the ends of record members 42, 44, 46, and 48 are clamped to the upper surface 41 of vacuum shoe 40 by the clamping means 50. The primary difference of this vacuum shoe and record member arrangement is that the rear wall 86 is provided with a portion 86′ which is curved in the direction of rotation of the rotor. The free ends 42′, 44′, 46′, and 48′ ride up on the surface 86′. This arrangement of the free ends of the record member provides a partial seal at the leading edge 60 of the vacuum shoe 40, whereby the vacuum requirements tend to be minimized. Additionally, in very long record member arrangements wherein the record members extend entirely around the surface of the rotor 22, the vacuum pressure can be such that it will cause the record member to be deflected or skewed toward wall 18, when the arrangemnet is such as illustrated in FIG. 2. However, when the ends of the record member are lapped onto surface 86′, it can be seen that there is a frictional relationship betwen the record members and surface 86′, and that the vacuum provided through port 64 tends to hold the record members at the free ends tightly against surface 86′. This tends to hold the record members in their proper alignment entirely around the surface of the rotor.

Figures 8, 9, 10, 12:
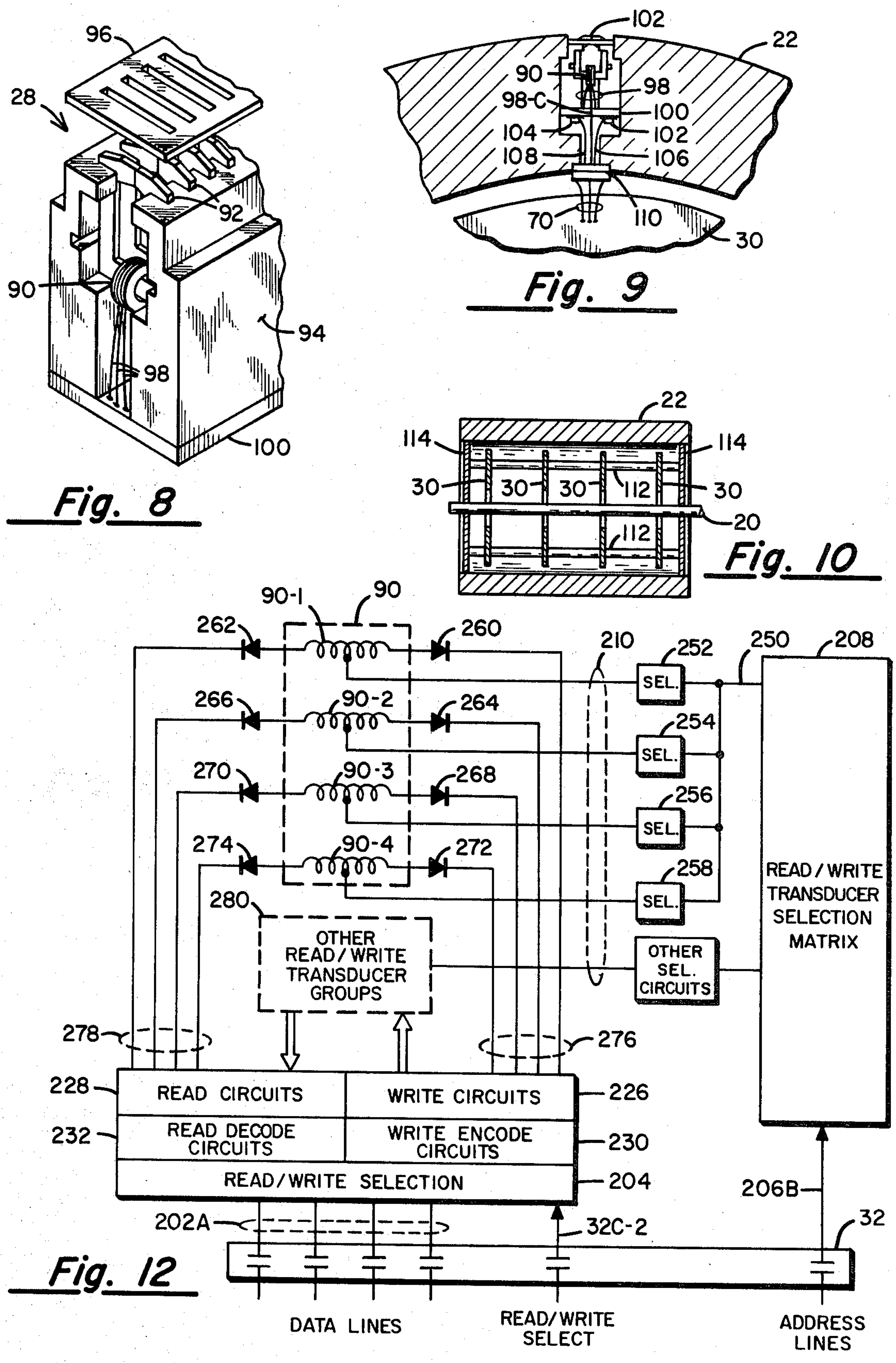
FIG. 8 is a partial perspective exploded view of the transducer mounting assembly.
FIG. 9 is a cross-sectional broken away view of the arrangement of the transducers when mounted in the rotor.
FIG. 10 is a cross-sectional view of the rotor and illustrates the mounting of the support members illustrated in FIG. 6 inside the rotor.
FIG. 12 is a block diagram of the read/write selection circuitry mounted in the rotor.

FIG. 8 is a partial perspective exploded view of the transducer mounting assembly. In this figure, the transducers 28 are shown as comprising pairs of core halves each coupled by a set of associated coils such as 90. These cores are of a type well-known in the art. The heads are mounted in slots 92 in a core block 94. The respective heads are held in a finely positioned alignment by a core spacer 96. The core spacer 96 can be held to a very close tolerance by an etching process. The leads from each of the coils, for instance as shown as leads 98, are directed through a diode supporting board 100 mounted at the base of the support block 94. The electrical arrangement will be described in more detail below. The entire assembly 28 is then slipped into a receiving slot formed in the rotor 22.

FIG. 9 is a cross-sectional broken away view of the arrangement of the transducers when mounted in the rotor. This figure illustrates the rotor 22 and a portion of the circuit supporting member 30. The outermost tip 102 of the transducer is substantially parallel with the outer surface of the rotor 22. The coil 90 has three leads collectively referred to as 98 projecting downward to the diode supporting board 100. Mounted to the diode supporting board 100 are a pair of diodes 102 and 104, with one such pair for each transducer. These diodes form a part of the transducer selection circuitry for differentiating between the reading and the writing functions. The operation will be described in more detail below. One terminal of each of the diodes is coupled by wire 106 and 108, respectively, to one-half of connector 110. The center tap wire 98–C is coupled directly to the half of the connector 110. The other half of connector 110 is coupled by cable 70 to the printed circuitry mounted on support board 30. The area around the transducers is sealed by a potting substance, thereby suspending the entire assembly in a fixed relationship with the outer surface of rotor 22.

FIG. 10 is a cross-sectional view of the rotor and illustrates the mounting of the support members illustrated in FIG. 6 inside the rotor. For illustrative purposes, four support members 30 have been shown, with each one being associated with one of the flexible record members. The support members 30 are held in substantially parallel alignment by spacer rods 112. Referring briefly to FIG. 6, it will be seen that there are four apertures therethrough for receiving the four support rods 112. Standoffs can be utilized between the record members 30 for holding them in rigid alignment. The support rods 112 terminate at each end in the mandrels 114.

Figure 11:
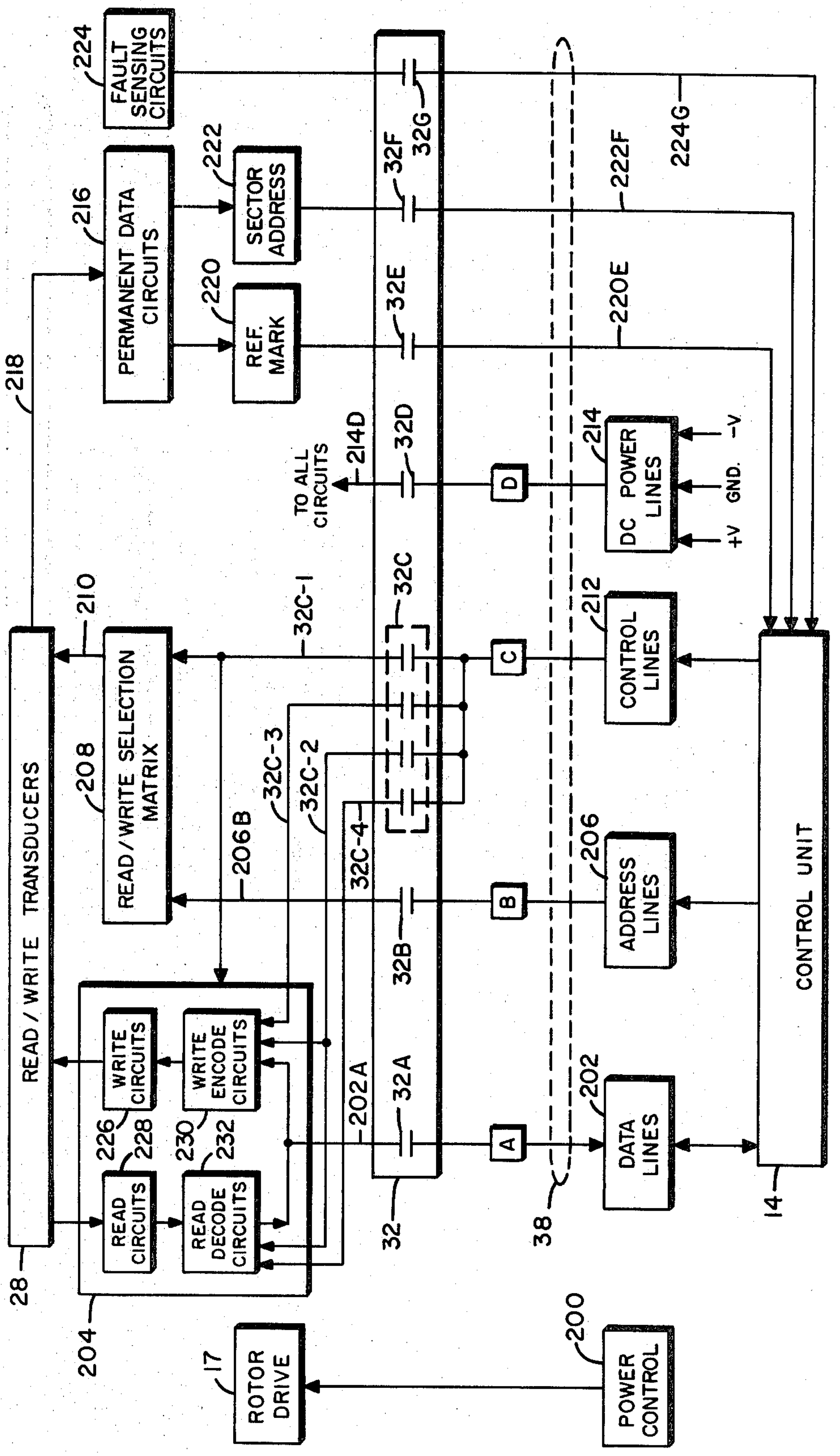
FIG. 11 is a block diagram that illustrates the portion of the read and recording circuitry that is mounted within the rotatable support member and the connections that are made with a utilization and control device.

FIG. 11 is a block diagram that illustrates the portion of the read and recording circuitry that is mounted within the rotatable support member and the connections that are made with the control device. In this consideration, the Control Unit 14 will perform the function described above of supplying and receiving data, establising the desired addresses, and providing the control pulses for determining the operation to be performed and the time that the selected operations are to be performed. The coupling to the Memory System is shown as block 32 with the respective couplings shown as parallel spaced-apart lines. This is illustrative only for showing that there is a movable coupling at these points. The cable 38 is comprised of a plurality of conductors which will be described. The power to the Memory System is provided by the Power Control 200. The Power Control includes On-Off switching of the AC power utilized for driving the drive motor 17. This power does not go through coupling 32, but instead, goes directly to the Memory System.

The Data Lines 202 are directed from the Control Unit 14 to the coupling contacts **32*a*. The number of data lines A will be determined by the number of Read/Write Transducers 28 that are to be scanned in parallel. For example, FIG. 12 illustrates four heads to be read in parallel. For such an example, there would be four contacts 32A. For a totally serial reading and recording Memory System, there would only be a single contact 32A. The data lines on the Memory System side of contacts 32A are directed via lines 202A to the Read/Write Circuitry shown in block 204**. This circuitry will be described in more detail below.

The Address Lines 206 are directed to the coupling contacts 32B. The number of parallel lines B and the number of contacts 32B will be determined by the size of the Memory System, and will be the number of lines necessary to address the system capacity. The Address Lines on the Memory System side of coupling 32 will be made by way of conductors 206B to the Read/Write Selection Matrix 208. The Read/Write Selection Matrix can comprise a diode matrix of a type well-known in the art. The selection of the Read/Write Selection Matrix is based on the digit permutations of the address signals presented in parallel on conductors 206B, and results in selected ones of the Read/Write Transducers 28 being selected by way of appropriate conductors in cable 210. The Control Lines 212 carried from the Control Unit 14 to the Memory System will be carried to coupling contacts 32C. The number of contacts C required will be basically one contact per control function. The particular control signals for this embodiment will be described in more detail below.

The DC Power Lines 214 will be coupled to the coupling contacts 32D. Since logic and functional circuitry are included within the rotor of the Memory System, it is necessary that the DC signals be provided to it. The number of lines D will depend upon the nature and the specific embodiments of the circuitry. For this discussion, it will be sufficient to indicate that there are a positive voltage, a system ground, and a negative voltage. These DC levels will be provided to the various circuits as indicated by cable 214D.

In order that the Control Unit 14 can synchronize the operation of the Memory System such that desired portions of the various flexible record members can be either read from or recorded on, it is necessary that control signals be fed from the Memory System to the Control Unit. In this regard, the Permanent Data Circuits 216 are coupled in a read-only capacity to selected ones of the Read/Write Transducers 28 by cable 218. In this regard, it will be noted that the flexible record members can have reference marks recorded thereon in a manner similar to that utilized in the magnetic drum art. Alternatively, a magnetizable disk can be fixedly attached in conjunction with rotor 22, or a portion of rotor 22 can be utilized, having separate read heads associated therewith for providing the Reference Mark signals to the external control circuitry for advising the control circuitry as to the position of the Read/Write Transducers 28 at any given instant of time. The Reference Mark can be of a type that is available once for each revolution of the rotor with the control circuitry being timed to establish the angular positions of the various Read/Write Transducers 28, or can be of a multiple type around the periphery of the rotor or on the flexible record members, such that the synchronization can be made periodically during the rotation of the rotor. The Reference Mark signal line 220 is carried to the coupling contact 32E and on the external side is directed on conductor 220E to the Control Unit 14. Additionally, a Sector Address line 222 is provided. The Sector Address refers to recorded bit permutations which uniquely identify the minimum addressable storage capacity on the flexible record members. Normally, a single conductor coupled to contact 32F and carried on conductor 222F to the Control Unit 14 will be sufficient. However, should the Sector Address be a parallel recorded indication or a partially parallel and partially serial recorded indication, there will be as many contacts 32F as there are bit positions carried in parallel.

The Memory System will have internal Fault Sensing Circuits 224 which will be coupled to contacts 32G. The Fault Sensing Circuits can include Over-temperature sensing devices, rotor-speed sensing devices, voltage-failure sensing devices, and the like. The fault signals will be carried on cable 224G to the Control Unit 14 where appropriate responses will be generated. These responses will normally include de-activating any storage functions then in process, and taking whatever remedial steps will be necessary to ensure that data is not destroyed.

The Read/Write Circuitry shown enclosed in block 204 includes the Write Driver Circuits 226 and the Read Amplifiers 228. These circuits can be selected from types available commercially and will not be described in detail. Coupled to the Write Circuits are the Write Encode Circuits 230. The Write Encode Circuits 230 will depend in its nature upon the type of recording system that is to be utilized. The type of recording system utilized is not intended to be limitive on this invention. For instance, the recording system can be selected from the types readily known in the magnetic drum and magnetic disk recording systems such as return-to-zero, nonreturn-to-zero, phase-modulation, or any other type well-known in the prior art. It is apparent, that the Write Encode Circuits receives as inputs on cable 202A, the digital signal permutations indicative of the data grouping to be stored. It is the function of the Write Encode Circuits 230, then, to establish the appropriate signal level for each digit position to be stored on the magnetic record member and to apply such signals to the selected Write Circuits 226. The Read Circuits 228 are coupled to the Read Decode Circuits 232, which in turn operate to perform the opposite function of that of the Write Encode Circuits. That is, the signals read from the magnetic record member by the Read Circuits 228 are operated on by the Read Decode Circuits for providing the digital signal levels for the appropriate ones and zeros in the data for transmission over cable 202A to the Control Unit 14.

In order to accomplish a reading or a writing operation, it is necessary that certain control signals be provided. Since the Control Unit 14 may possibly be controlling other Memory Systems, it is necessary to provide a Memory System Enable signal. This Enable signal is provided on conductor 32C–1 to both the Read/Write Selection Matrix 208 and the Read/Write Circuitry 204. In the absence of this Enable signal, any of the other control signals that are provided will be ineffective to either read from the record member or to record on the record member. Assuming first that a write operation is to be performed, it is necessary to provide a signal on the Read/Write Select Line 32C–2 to the Write Encode Circuits 230. It will be noted that the same signal is directed to the Read Decode Circuits 232, but will be of a polarity to deactivate the Read decode circuits. It will be recalled that the Reference Mark 220 and the Sector Address signals 222 are directed to the Control Unit 14. When it is determined that the address provided to the Read/Write Selection Matrix 208 on the Address Lines 206 matches the address of the portion of the flexible record member then in cooperation with the Read/Write Transducers 28, a Write Synchronizing pulse is provided on line 32C–3 to the Write Encode Circuits 230. This last synchronizing pulse operates as the final gating control for enabling the transmission of the data presented on cable 202A to the Write Encode Circuits 230, to be encoded and passed through to the Write Circuits 226 for recording at the positions determined by the Read/Write Selection Matrix 208.

Next considering a read operation, it will be recalled that the Enable signal provided on line 32C–1 is provided to the Read/Write Circuits 204 and the Read/Write Selection Matrix 208. To make the read selection, a signal of an opposite polarity for that of the write operation is provided on the Read/Write Select line 32C–2 and directed to the Read Decode Circuits 232 and the Write Encode Circuits 230. Since the polarity of the signal is recognized as enabling the Read Decode Circuits 232, it will be understood that the Write Encode Circuits will be disabled by the same pulse. This enabling and disabling technique is of a type well-known in the prior art. Again, the Reference Mark provided on conductor 220E and the Sector Address provided on conductors 222F are provided to the Control Unit 14. When it is determined that the address submitted to the Memory System on cable 206B matches the indication of the address presently in cooperation with the Read/Write Transducers, and a Read Synchronizing pulse will be provided to the Read Decode Circuits 232 on line 32C–4. This Read Synchronizing pulse is the final control signal that enables the Read Decode Circuits 232 to operate on the signals provided thereto from the Read Circuits 228, and to provide the appropriate digital signals on cable 202A to the Data Lines for use in the Control Unit 14.

In the prior art memory systems which included heads mounted in a rotatable support member, it was common to provide a contact for each read line and a contact for each write line. This followed since there was no selection circuitry mounted in the rotor. It can readily be seen, that the improvement of providing the selection circuitry in the rotor greatly minimizes the number of contacts required. It will be recalled from the above, that it was stated that each tape strip has associated therewith, characteristically, 256 tracks. This would mean in the prior art, that for each flexible record member there would be required 512 contacts just for carrying data to and from the record members. There would of course be the additional contacts needed for the synchronizing and control lines. It will be recalled also, that four flexible magnetic tape record members are utilized in this embodiment. In the absence of any switching or selection circuitry on the rotor, the 512 contacts for each tape strip required in the prior art, would have to be increased by a factor of four times, in order to handle the four separate record members. It can readily be seen that such an arrangement is not operationally feasible and would be prohibitive in terms of expense. Accordingly, it can be seen that this one feature alone greatly improves over the prior art systems. When this is coupled with the other operational improvements of this invention it can be seem that a significant advance over the prior art results.

FIG. 12 is a block diagram of the read/write selection circuitry mounted in the rotor and is provided to more particularly point out the arrangement of the selection dioles mentioned in the discussion of FIGS. 8 and 9. Circuitry that has previously been described bears the same reference numeral designation. It will be noted in this figure, that four read/write coils 90 shown enclosed in dashed block 90, are grouped for parallel reading and recording. The choice of groupings of four is arbitrary as mentioned above, and could equally as well be one, or as many as desired. For purposes of illustration, if it is assumed that the address received on cable 206B by the Read/Write Transducer Selection Matrix 208 is that address utilized to designate coils 90, an activating signal will be on line 250 to enable the Select Circuits 252, 254, 256, and 258. These Select Circuits are well-known and are coupled to the center-tap of respectively associated ones of the coils 90 by way of the conductors which are included in cable 210. Each of the coils 90 has associated therewith, a pair of diodes as described above. Coil 90–1 has associated therewith diodes 260 and 262; coil 90–2 has associated therewith diodes 264 and 266; coil 90–3 has associated therewith diodes 268 and 270; and coil 90–4 has associated therewith diodes 272 and 274. Diodes 260, 264, 268, and 272 are coupled by conductors collectively referred to as cable 276 to the Write Circuits 226. Diodes 262, 266, 270, and 274 are respectively coupled to Read Circuits 228 by conductors referred to as cable 278. The diodes just enumerated, and the diodes associated with the remainder of the read/write transducer groups 280 are mounted on boards such as diode board 100 described above and are packaged as a portion of the circuitry referred to as a transducer circuitry. The form of the Read/Write Select signal received on conductor 32C–2 determines whether cr not the Read Circuits 228 or the Write Circuits 226 will be functional, thereby determining whether data will be flowing into the Memory System, or out of the Memory System on cable 202A. The other control signals described above are not duplicated here since it would not tend to add to an understanding of the invention.

CONCLUSION

The foregoing has been a description of an improved Memory System wherein transducers are mounted in a rotatable support member for cooperation with one or more flexible record members which are clamped at one end and supported on a boundary layer of air around the periphery of the rotatable support member. A portion of the transducer selection circuitry is mounted within the confines of the rotatable support member with the data signals and the control signals being provided to and from the Memory System through a movable coupling. The profile of the flexible record members is corrected by the incorporation of a profile correction apparatus. For the preferred embodiment, the profile correction apparatus is a vacuum system which is utilized to bleed off a portion of the laminar air flow, thereby bringing the profile of the record members into a relatively uniform cooperative relationship with the surface of the rotatable support member. As described above, the inclusion of the profile correction system eliminates one of the major problems of the prior art memory systems. Further, the inclusion of the mounting of the selection circuitry inside the rotatable support member greatly minimizes the number of couplings required for getting data to the Memory System and reading data from the Memory System. Finally, the overall construction is such that an average access rate of one millisecond in a mass storage device can be achieved by providing the rotor and the associated circuitry mounted therein with the physical characteristics such that revolutions of approximately 7200 r.p.m. can be achieved.

In view of the foregoing, it can be seen that all of the objectives and purposes enumerated above have been met, and that an improved Memory System has resulted. Accordingly, it being recognized that various alterations in the detail aspects of the construction will become apparent to those skilled in the art without departing from the spirit of the invention, what is intended to be protected by Letters Patent is set forth in the appended claims.

What is claimed is:

1. An improved memory system comprising: housing means; rotatable transducer support means rotatively mounted on said housing means and having a predetermined length and a substantially cylindrical cross-section with inner and outer surfaces; a plurality of transducer means mounted in said rotatable transducer support means and each having a portion thereof adjacent said outer surface; at least one flexible record member having first and second ends and predetermined width, length, and thickness dimensions, and having a magnetizable material on one surface thereof for inductively cooperating with said transducer means; record member securing means mounted on said housing means for securing said first end of said record member in a predetermined relationship with said outer surface; means for causing said rotatable transducer support means to rotate in a predetermined direction, said outer surface operative during said rotation for supporting said flexible record member on a boundary layer of air, around at least a portion of said outer surface, but out of contact therewith; rotative coupling means; circuit means mounted within said rotatable transducer support means, said circuit means including transducer selection matrix means for receiving and decoding address signals from said coupling means and then selecting addressed ones of said transducer means and further including read/write selection means for receiving read or write control signals from said coupling means and then selecting associated read or write circuitry for reading from or writing on said flexible record member with said addressed ones of said transducer means.

2. A memory system as in claim 1 and further including a plurality of said flexible record members inductively cooperating with said transducer means.

3. A memory system as in claim 1 wherein said transducer selection matrix means further includes means for receiving and decoding sector address signals from said coupling means and then controlling said addressed ones of said transducer means to read from or write on said flexible record member only in the addressed sector as identified by said sector address signals.

4. A memory system as in claim 1 wherein individual ones of said transducers define a track of data on said flexible record member.

5. A memory system as in claim 4 wherein said transducer means are mounted in a plurality of rows arranged around the periphery of said rotatable support means, each of said rows being off-set along the length of said rotatable support means with respect to the other of said rows.

6. A memory system as in claim 1 wherein said transducer selection matrix means further includes means coupled to one of said transducer means for inductively generating a reference mark signal from said flexible record member and timing the reading from or writing on said flexible record member.

7. In an improved memory system, apparatus comprising: housing means; rotatable transducer support means rotatively mounted on said housing means and having an outer surface of a predetermined length for supporting a flexible record member on a boundary layer of air, said support means including transducer mounting means and a component mounting chamber therein; a plurality of transducer means mounted in said transducer mounting means for inductively cooperating with said flexible record member; selectively actuatable circuit means mounted in said component mounting chamber for actuating selected ones of said transducer means for causing signals to be recorded at or read from addressable positions on said flexible record member; control means; rotative coupling means for rotatively coupling said control means to said circuit means, said circuit means including a first means for receiving input data signals from said control means to be recorded on said flexible record member or for receiving output data signals read from said flexible record member and to be coupled to said control means, a second means for receiving and decoding address signals for selecting predetermined ones of said transducer means for recording said received input data signals on said addressable positions on said flexible record member or for reading said output data signals from said addressable positions on said flexible record member, and a third means for receiving control signals for determining when recording on or reading from said flexible record member is to take place.

8. In a memory system as in claim 7 wherein said third means includes means for receiving operation control signals for alternatively selecting between recording and reading and for receiving reading synchronizing control signals for determining when reading is to take place.

9. In a memory system as in claim 7 wherein said first means includes recording encoding circuit means for encoding said received input data signals and recording driver circuit means coupled to said recording encoding circuit means and said selected ones of said transducer means for causing recording.

10. In a memory system as in claim 9 wherein said first means includes reading amplifier circuit means coupled to said selected ones of said transducer means for reading said output data signals from said addressable positions on said flexible record member; reading decoding circuit means coupled to said reading amplifier circuit means for decoding said output data signals so read, and output means coupled to said reading decoding circuit means for transmitting said decoded output data signals to said rotative coupling means for transmission to said control means.

11. An improved memory system comprising: housing means; rotatable transducer support means rotatively mounted on said housing means and having a predetermined length with an outer surface and a circuit mounting chamber therein; a plurality of transducer means mounted in said rotatable transducer support means; at least one flexible record member, having first and second ends and predetermined width, length, and thickness dimensions, and having a magnetizable material on one surface thereof for inductively cooperating with said transducer means; record member positioning means mounted on said housing means for positioning said record member in a predetermined relationship with said outer surface; means for causing said rotatable transducer support means to rotate in a predetermined direction, said outer surface operative during said rotation to support said flexible record member on a boundary layer of air, around at least a portion of said outer surface, but out of contact therewith; control means; circuit means including recording circuit means including recording driving circuit means and recordng encoding circuit means, both mounted within said circuit mounting chamber, said recording circuit means coupled to associated ones of said transducer means for recording at an addressed portion of said flexible record member; and rotative coupling means for electrically intercoupling said control means and said circuit means for rotatively coupling recording and reading control signals, received input data signals and address signals from said control means to said recording circuit means for effecting recording of said received input data signals on said addressd portion of said flexible record member.

12. An improved memory system as in claim 11 wherein said positioning means includes a securing means for securing one end of said flexible record member.

13. An improved memory system as in claim 11 wherein said circuit means further includes reading circuit means including reading amplifier circuit means and reading decoding circuit means, both mounted in said circuit mounting chamber, for effecting reading of output data signals from said addressed portion of said flexible record member, said control means selectively alternatively actuating said recording circuit means or said reading circuit means in response to said reading control signals received from said control means.

14. A memory system as in claim 13 wherein said circuit means mounted within said rotatable transducer support means includes transducer selection matrix means coupled to said plurality of transducer means and said rotative coupling means for decoding said address signals and selecting predetermined ones of said transducer means in response to said address signals; control lines coupled to said rotative coupling means for receiving said recording control signals and reading control signals from said control means; said recording circuit means coupled to said transducer means and including recording control signal receiving means coupled to ones of said control lines and input means coupled to said rotative coupling means for receiving input data signals from said control means to be recorded on said flexible record member; and said reading circuit means coupled to said transducer means and including reading control signal receiving means coupled to ones of said control lines, and output means coupled to said rotative coupling means for transmitting output data signals read from said flexible record member to said control means.

15. A memory system as in claim 11 wherein individual ones of said transducers each define a corresponding track of data on said flexible record member.

16. A memory system as in claim 15 and further including a plurality of said flexible record members, said flexible record members each having said magnetizable material juxtaposed said outer surface.

References Cited

UNITED STATES PATENTS

| | | | |
|---|---|---|---|
| 2,747,025 | 5/1956 | Selsted | 179—100.2 |
| 2,954,911 | 10/1960 | Baumeister et al. | 226—95 |
| 2,962,200 | 11/1960 | Pouliart et al. | 179—100.2 |
| 3,281,039 | 10/1966 | Foley | 226—95 |
| 3,286,895 | 11/1966 | Poumakis | 226—95 |
| 3,330,033 | 7/1967 | Manders et al. | 179—100.2 |
| 3,333,064 | 7/1967 | Dolby | 179—100.2 |
| 3,333,753 | 8/1967 | Streets | 179—100.2 |
| 3,395,248 | 7/1968 | Suzuki et al. | 179—100.2 |
| 3,465,320 | 9/1969 | Weidenhammer et al. | 179—100.2 |

BERNARD KONICK, Primary Examiner

V. P. CANNEY, Assistant Examiner

U.S. Cl. X.R.

226—95